G. W. Dickinson,
Corn Planter.

No. 94,404.        Patented Aug. 31, 1869.

Witnesses
James P. Greves
Dennis D. Kane

Inventor
Geo. W. Dickinson

Chipman Hosmer & Co.
attys

United States Patent Office.

GEORGE W. DICKINSON, OF CHARLESTON, ILLINOIS.

Letters Patent No. 94,404, dated August 31, 1869.

IMPROVEMENT IN CORN-PLANTER AND GRAIN-DRILL.

The Schedule referred to in these Letters Patent and making part of the same.

*To all whom it may concern:*

Be it known that I, GEORGE W. DICKINSON, of Charleston, in the county of Coles, and State of Illinois, have invented a new and valuable Improvement in Corn-Planters, Wheat-Drills, Cultivators, and Rollers; and I do hereby declare that the following is a full, clear, and exact description of the construction and operation of the same, reference being had to the annexed drawings, making a part of this specification, and to the letters and figures of reference marked thereon.

Figure 1:
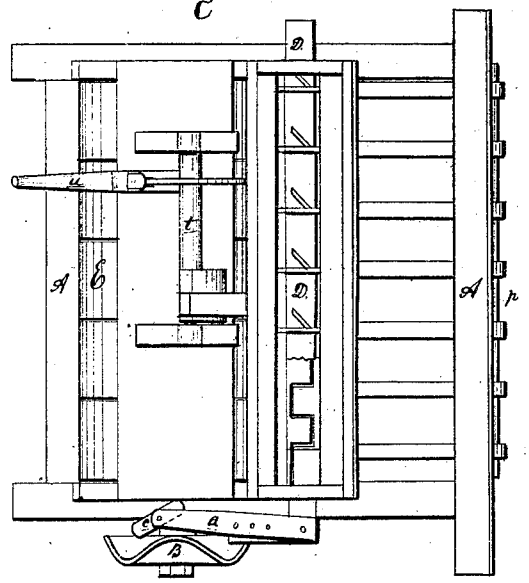
Figure 3:
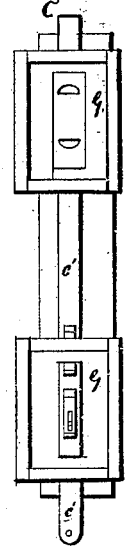
Figure 4:

Figure 1, of the drawings, is a plan view of my invention.

Figure 2:
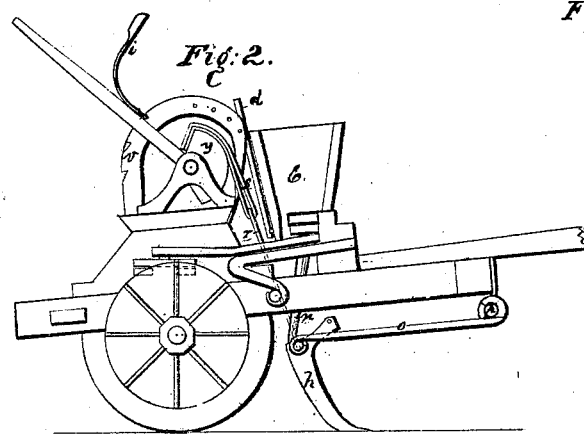
Figure 5:
Figure 6:
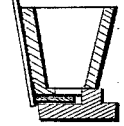

Figure 2 is a sectional view of the same.

Figures 3, 4, 5, and 6, are details.

My invention relates to agricultural implements; and

It consists mainly in the construction and novel arrangement of devices, by means of which grain may be sowed in drills, and the ground rolled by one movement of the machine; and It also consists in providing means for substituting a corn-planter in the place of the sowing-apparatus.

My invention is arranged in the form of a sulky grain-sower, with a frame marked A on the drawings.

At the right-hand end of the axle, (from the driver's seat,) I affix a corrugated wheel, marked B, which rotates with the axle, but does not touch the ground.

The letter C represents the seed-box, having openings through its bottom, which are alternately opened and closed by the movements of the sliding bar D, as hereinafter mentioned.

The letter D represents a sliding bar arranged in the bottom of the seed-box. It has openings corresponding to the openings in the bottom of the seed-box, through which the grain passes when such openings are brought together.

The letter $a$ represents a pivoted lever, united at one end with the end of bar D, and at the other, to the pivoted cross-head $c$.

This cross-head $c$ is pivoted at its centre to the rear end of lever $a$, and it has friction-rollers attached to it in the manner shown on fig. 2 of the drawings.

The corrugated wheel B has its rim or periphery working between the rollers of cross-head $c$, and thereby moves the rear end of lever $a$ outward and inward by movements corresponding with its corrugations.

The object of these last-mentioned devices is to move the sliding bar D back and forth in the bottom of the seed-box, and thereby uncover and close the above-named openings for the passage of the seed downward from the seed-box.

The letter $h$ represents one of a series of cultivator-plows, with a passage or opening extending from its top to its bottom.

Each of these plows is connected with the bottom of the seed-box by a flexible conduit, marked $n$ on the drawings.

These conduits are respectively arranged below the openings in the seed-box above named, and are intended to conduct the seed from the box into the openings in the plows. The seed passes through both conduits and plows to the ground.

The plows above mentioned are arranged upon a cross-bar suspended below the frame of the carriage, and there are arms marked $o$, which extend from such cross-bar to a front cross-bar or roller, $p$, as represented on fig. 1.

The letter $r$ represents one or more cords or wires extending from the cross-bar, to which the plows are attached, and united with the strap $s$, in the manner shown.

The letter $t$ is a roller arranged in a suitable frame upon the carriage, and to which is attached the lever $u$ in the manner represented.

The letter $i$ is a dog pivoted to the lever $u$, as shown, and working in the teeth of the ratchet $v$, next mentioned.

The ratchet $v$ is constructed and arranged as shown, and, in conjunction with the roller, lever, and dog last mentioned, serves to adjust the plows in any desired position.

The letter $y$ represents a cam affixed to the roller $t$, to which the strap $s$ is affixed, and which serves as an additional lever for raising or lowering the plows.

The letter E represents a sectional roller affixed to the axle in the rear of the cultivator-plows, which is intended for use in rolling the ground.

The letter $d$ represents a lever affixed to the sliding bottom of the seed-box, and serves as a means for opening and closing the apparatus in said bottom whenever the means above described are inadequate thereto.

The seed-box, above described, is attached to the frame by screws that pass through a flange on its front side, and is thereby made removable at will.

The letter G represents a seed-box for planting corn. It is substituted for the seed-box C whenever I desire. When this is done, the lever $a$ is attached to the sliding bar $c'$, and the openings in the box and bar $c'$ are operated thereby, in the same manner as the openings in seed-box C.

When the corn-planter seed-box is attached, all the plows, save the two outer ones upon the cross-bar, should or may be removed.

I sometimes substitute another cross-bar, with two plows only upon it, in the place of the bar and series of plows above described.

What I claim as my invention, and desire to secure by Letters Patent, is—

The combination and arrangement of the corrugated wheel B, pivoted lever $a$, cross-head $c$, sliding bar D, lever $d$, strap $s$, roller $t$, cam $y$, and ratchet $v$, substantially as and for the purposes specified.

In testimony that I claim the above, I have hereunto subscribed my name, in the presence of two witnesses.

GEORGE W. DICKINSON.

Witnesses:
J. W. SHAFFER,
H. S. PARCELS.